H. N. McCONOUGHEY.
Check-Rower for Corn-Planter.
No. 203,357. Patented May 7, 1878.
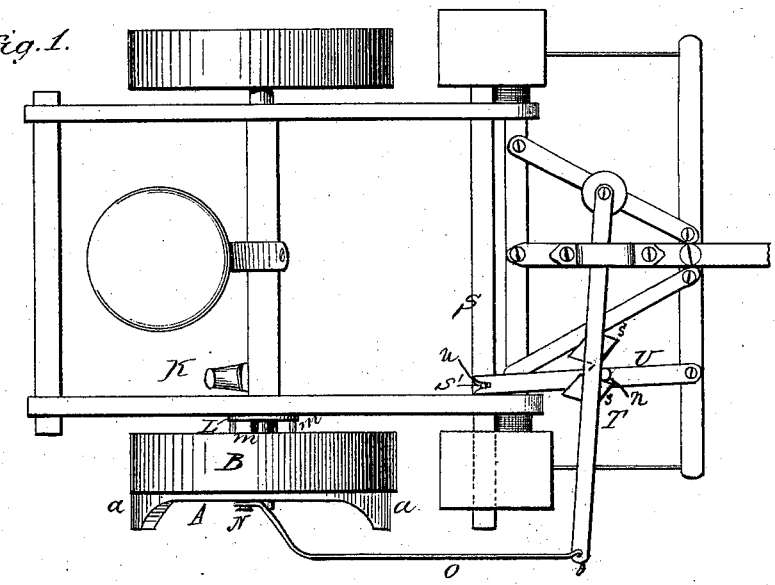
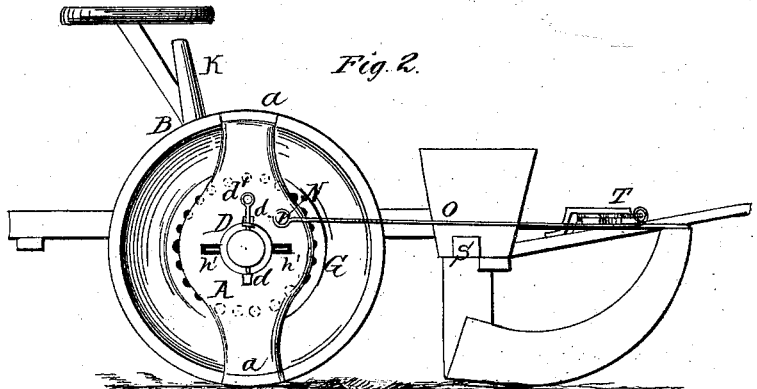
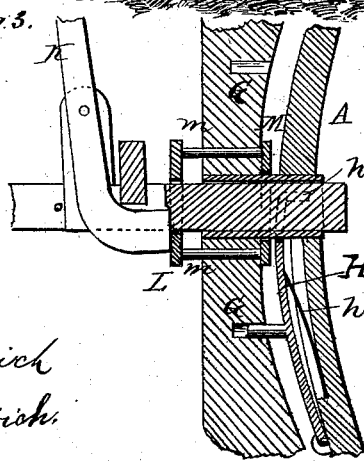
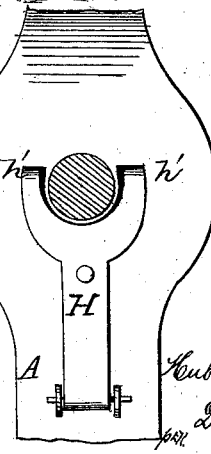

UNITED STATES PATENT OFFICE.

HULBERT N. McCONOUGHEY, OF DOUGLAS TOWNSHIP, MONTGOMERY COUNTY, IOWA, ASSIGNOR OF ONE-HALF HIS RIGHT TO HENRY M. HIGGINS, OF SAME PLACE.

IMPROVEMENT IN CHECK-ROWERS FOR CORN-PLANTERS.

Specification forming part of Letters Patent No. 203,357, dated May 7, 1878; application filed March 8, 1878.

*To all whom it may concern:*

Be it known that I, HULBERT N. McCONOUGHEY, of Douglas township, in the county of Montgomery and State of Iowa, have invented certain new and useful Improvements in Check-Rowers for Corn-Planters; and I do hereby declare the following to be a full, clear, and exact description of the same, reference being made to the accompanying drawing, forming a part of this specification, and in which—

Figure 1 is a top-plan view. Fig. 2 is a side elevation. Fig. 3 is a detached sectional view of the marking-disk; and Fig. 4 is a rear view of same.

The object of my invention is to provide an attachment to be used on an ordinary corn-planter, or those planters in general use, by means of which the hills can be made in rows two ways, transversely as well as longitudinally, throughout the field.

This invention relates more particularly to that class of planters in which the seeding or dropping mechanism is operated through the medium of a revolving marking attachment; and the invention consists in the combination of parts, as will be hereinafter fully described, and pointed out in the claims.

In the drawing, A represents a laterally-adjustable bar or disk rotating upon the hub or axle of the covering-wheel B, and connected therewith by a pawl-lever, H, working into a ratchet-wheel, G, attached to said covering-wheel B. The adjustable bar or disk A is provided with short flanges $a\ a$, by which each hill is marked as planted.

The pawl-lever H is hinged at its outer extremity to the adjustable bar or disk A, and held in place by a spring, $h$, said pawl-lever being forked near its inner extremity, so as to pass on opposite sides of the hub of covering-wheel B, where the points $h'\ h'$ are bent and pass through said bar or disk to engage with a washer, D, having projections or lugs $d\ d$ thereon, and which is held rigidly in place by a linchpin, $d'$.

The pawl-lever H is controlled by a hand-lever, K, near the driver's seat, working against a collar, L, sliding upon the inside point of the hub of the covering-wheel B, or upon the axle-tree thereof, and rigidly attached to a similar collar, M, by bolts or rivets $m$ passing through covering-wheel B, or between the spokes of the same, said collar M sliding upon the outside point of the hub immediately behind the forked points of the pawl-lever H.

The said laterally-adjustable bar or disk A, besides bearing the flanges $a\ a$ and pawl-lever H, above mentioned, carries a crank-pin, N, to which is attached the pitman-rod O, which moves the dropping apparatus, consisting of a lever, T, lying transversely across the machine in front of dropping-bar S, and pivoted to frame at opposite end from its connection with pitman-rod O; and to the under surface of said lever are fastened two diamond-shaped cams, $s\ s$, which engage and pass a friction-roller, $n$, pivoted perpendicularly on the upper surface of a lever, U, hinged or pivoted to front part of machine, and passing back under lever T, at right angles therewith, to engage a stud, $s'$, in the dropping-bar by means of a slot, $u$, in the end of said lever.

The operation of the device is as follows: When the planter is drawn across the field, the adjustable bar or disk A remains rigid with covering-wheel B, (unless thrown out of gear,) and therefore makes a mark, by its flanges $a\ a$, beside each hill planted by the dropping apparatus, as above described, and in every subsequent return any variation of line between hills may be easily detected and rectified. In any case of loss of distance the correction can be made without stopping, by simply pressing hand-lever K until the dropping apparatus is locked by points $h'\ h'$ of pawl-lever H coming against lugs $d$ on washer D on point of axle, and holding it until the loss is taken up.

If by any means there should be a gain, (which is seldom,) the machine must be stopped, and the hand-lever pressed just far enough to throw the pawl-lever out of gear with the ratchet-wheel, when the adjustable bar or disk A may be turned either way at pleasure, to remedy the defect.

In turning the machine at the ends of the field, lock the dropping apparatus and turn the machine around, and when the shoe comes in line with first row release the hand-lever, which will allow the dropping apparatus to be automatically thrown in gear.

The wheels can be provided with a scraper, as usual, with an addition to their length, to scrape the marking-flanges $a\ a$.

I claim as my invention—

1. In a corn-planter, the combination, with the covering-wheel, having a ratchet-wheel, or its equivalent, of the laterally-adjustable marking bar or disk, having a hinged or pivoted spring-pawl lever arranged between said marking bar or disk and covering-wheel, and a hand-lever, and intermediate mechanism, substantially as and for the purpose herein shown and described.

2. The combination, with the adjustable marking bar or disk, of the forked pawl-lever H, having the points $h'\ h'$, and the stationary washer D, provided with the lugs $d\ d$, substantially as and for the purpose specified.

3. The combination, with the laterally-adjustable marking bar or disk A, and dropping-bar S, of the intermediate connecting mechanism consisting of the pitman-rod O, pivoted lever T, and cross-lever U, substantially as and for the purpose herein shown and described.

4. The combination of the pivoted lever provided with the cams $s\ s$, pivoted slotted cross-lever U, having friction-roller $n$, and the dropping-bar S, provided with the stud $s'$, substantially as herein shown and described.

HULBERT N. McCONOUGHEY.

Witnesses:
S. M. SMITH,
HENRY HOWARD.